United States Patent
Greening et al.

(10) Patent No.: US 10,236,694 B2
(45) Date of Patent: Mar. 19, 2019

(54) SYSTEMS AND METHODS FOR MANAGEMENT OF ASYMMETRICAL MULTI-TAPPED BATTERY PACKS

(71) Applicant: Apple Inc., Cupertino, CA (US)

(72) Inventors: Thomas C. Greening, San Jose, CA (US); Karthik Kadirvel, San Jose, CA (US); Gary L. Stirk, West Melbourne, FL (US); Saroj K. Sahu, Fremont, CA (US); Kamran M. Hasan, Toronto (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/662,408

(22) Filed: Jul. 28, 2017

(65) Prior Publication Data

US 2018/0034288 A1 Feb. 1, 2018

Related U.S. Application Data

(60) Provisional application No. 62/368,666, filed on Jul. 29, 2016.

(30) Foreign Application Priority Data

Nov. 30, 2016 (SG) .............. 10201610038S

(51) Int. Cl.
| | |
|---|---|
| *H02J 7/14* | (2006.01) |
| *H02J 7/16* | (2006.01) |
| *H02J 7/00* | (2006.01) |
| *H01M 10/42* | (2006.01) |
| *H01M 10/44* | (2006.01) |

(52) U.S. Cl.
CPC ......... *H02J 7/0019* (2013.01); *H01M 10/425* (2013.01); *H01M 10/441* (2013.01); *H02J 7/0022* (2013.01); *H02J 7/0026* (2013.01); *H02J 7/0077* (2013.01); *H01M 2010/4271* (2013.01); *H02J 2007/0098* (2013.01)

(58) Field of Classification Search
CPC ...................................................... H02J 7/0019
USPC ........................................................ 320/118
See application file for complete search history.

(56) References Cited

U.S. PATENT DOCUMENTS

| | | |
|---|---|---|
| 8,115,446 B2 | 2/2012 | Piccard |
| 9,325,177 B2 | 4/2016 | van Zwam |

(Continued)

FOREIGN PATENT DOCUMENTS

| | | |
|---|---|---|
| CN | 202840562 U | 3/2013 |

*Primary Examiner* — Edward Tso
*Assistant Examiner* — Ahmed Omar
(74) *Attorney, Agent, or Firm* — Blank Rome LLP

(57) ABSTRACT

This disclosure describes a battery pack that includes a plurality of asymmetrical banks, with different capacities and/or voltages, and multiple taps, coupled to the corresponding banks, to power electrical loads. The battery pack also comprise a balancing circuit and a battery management unit. The battery pack may regulate voltages among the banks and/or balance the states of charge among the asymmetrical banks, by moving charges among the banks, by controlling one or more converters. The battery pack monitors the status of its banks and communicate with a host system via the battery management unit. Based on the monitored information and/or communication, the battery management unit generates control signals to drive the one or more converters.

27 Claims, 9 Drawing Sheets

(56) References Cited

U.S. PATENT DOCUMENTS

| | | |
|---|---|---|
| 2006/0006841 A1 | 1/2006 | Lee |
| 2008/0191663 A1 | 8/2008 | Fowler |
| 2011/0267005 A1 | 11/2011 | Gollob |
| 2014/0183939 A1* | 7/2014 | Jiang .................. B60L 11/1853 307/9.1 |
| 2014/0232346 A1* | 8/2014 | Zhang ................ B60L 11/1861 320/118 |
| 2014/0312844 A1* | 10/2014 | Mercier ................ H02J 1/102 320/118 |
| 2015/0207339 A1 | 7/2015 | Hamburgen |
| 2016/0006276 A1 | 1/2016 | Mikulec |
| 2016/0241051 A1* | 8/2016 | Yang .................... H01M 10/48 |

* cited by examiner

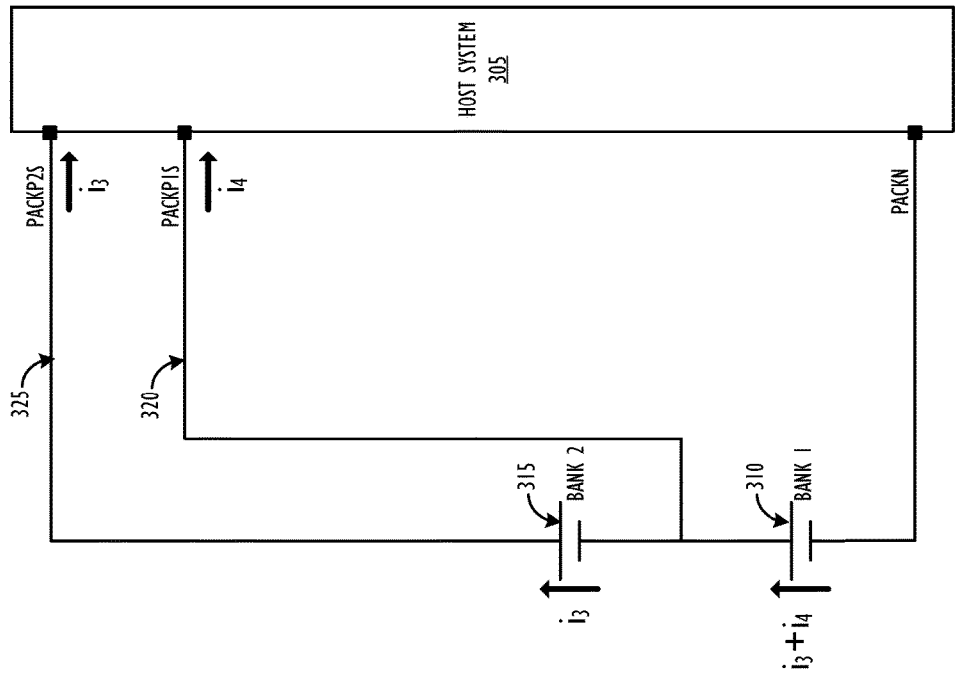
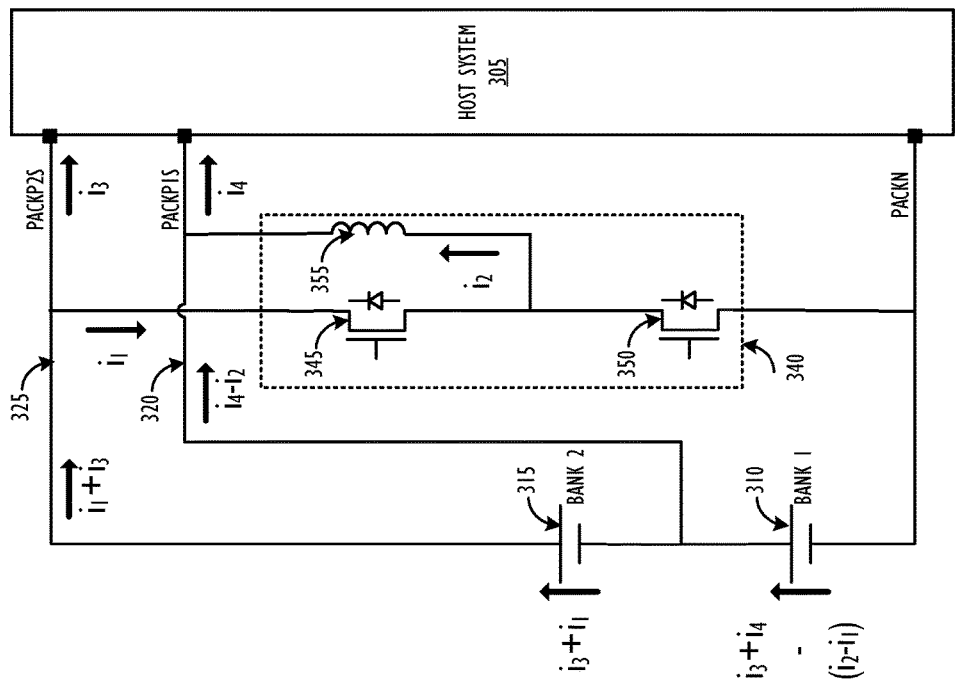
FIG. 4A
FIG. 4B

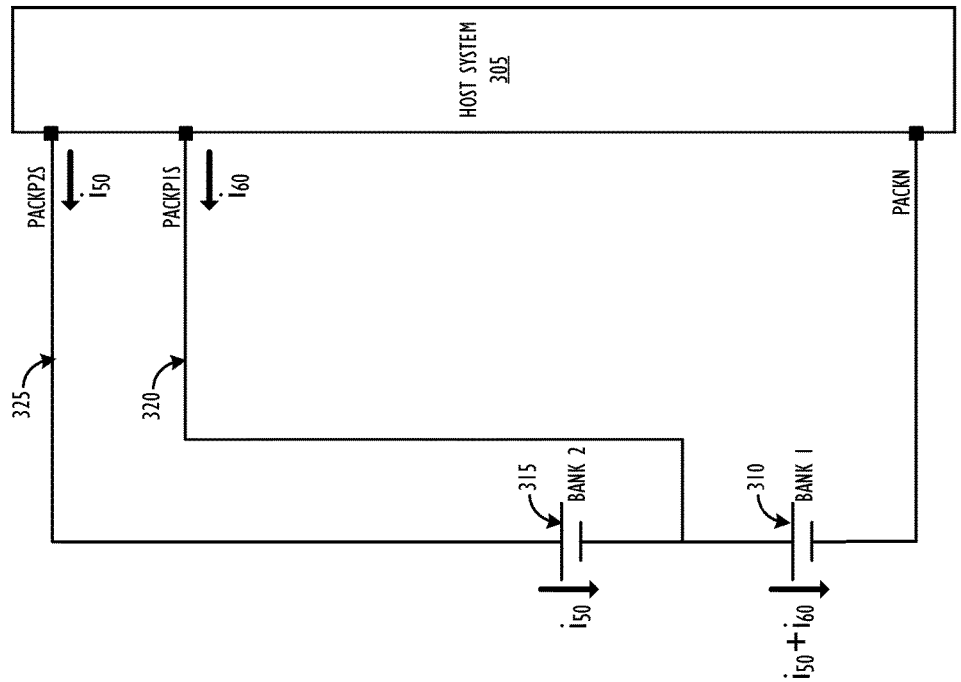
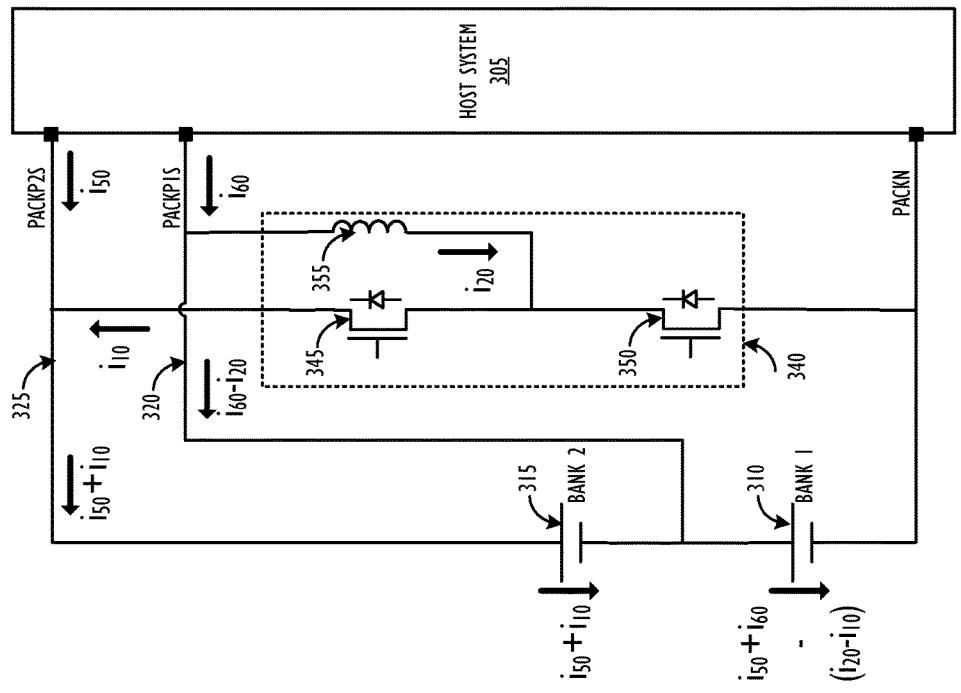

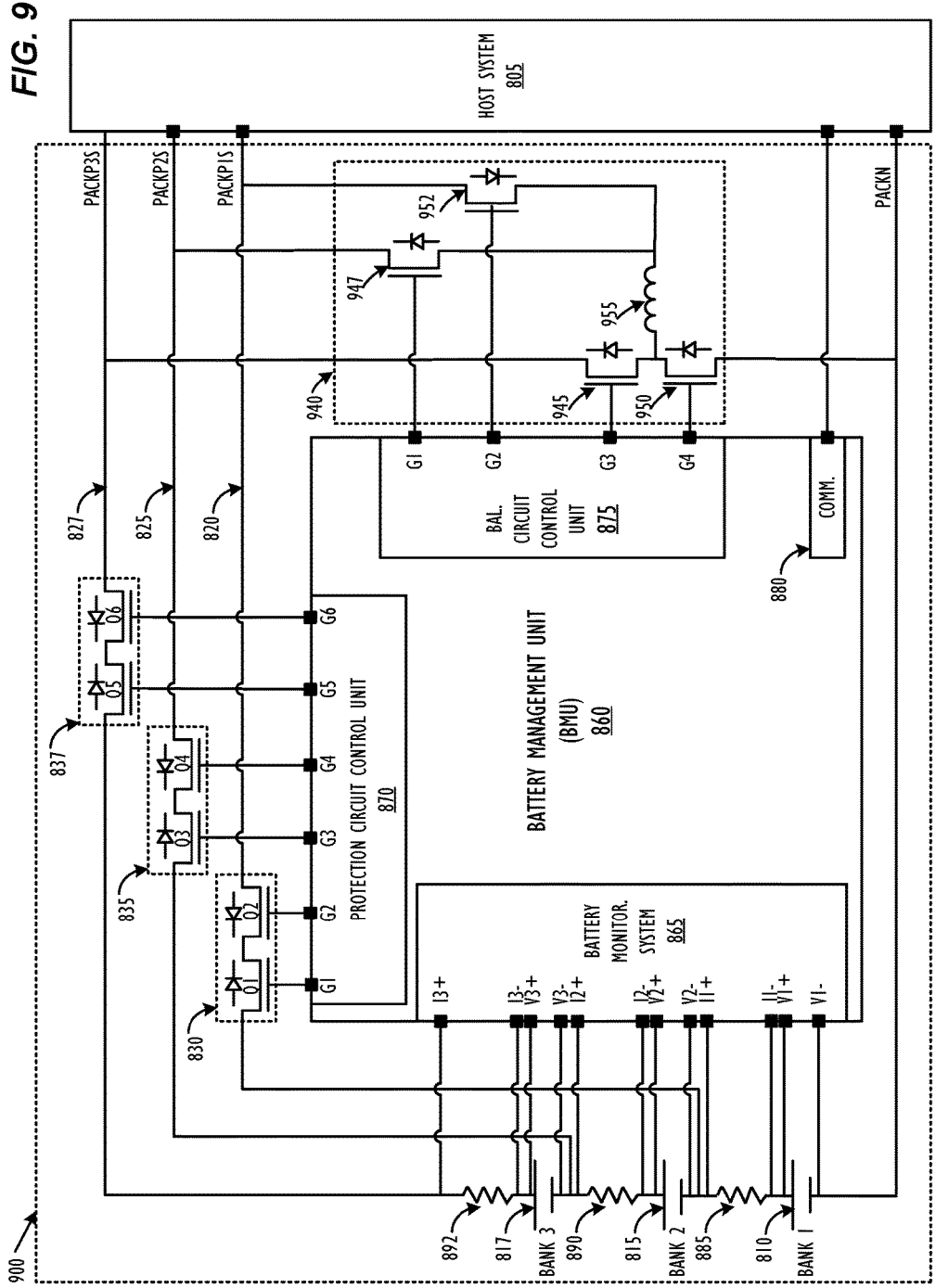

SYSTEMS AND METHODS FOR MANAGEMENT OF ASYMMETRICAL MULTI-TAPPED BATTERY PACKS

CROSS REFERENCE TO RELATED APPLICATIONS

This application claims priority to the U.S. Provisional Application Ser. No. 62/368,666 and Singapore Application Ser. No. 10201610038S, both entitled "Systems and Methods for Management of Asymmetrical Multi-Tapped Battery Packs", the contents of which are herein incorporated by reference in their entirety.

TECHNICAL FIELD

This disclosure relates generally to battery packs comprising multiple banks, and in particular, to battery packs comprising asymmetrical banks with multiple taps. In addition, this disclosure describes apparatuses and methods to balance the states of charge (SOC) between multi-tapped, asymmetrical banks.

BACKGROUND

A battery pack is an energy source consisting of one or more bank, for example, in series, with external connections (or taps) provided to power electrical loads, wherein each of the bank may further comprise one or more cells in parallel. Conventional battery packs typically employ symmetrical configurations, wherein the banks have the same nominal capacity measured in the unit of ampere-hour (Ah).

FIG. 1 shows an exemplary symmetrical battery pack 100, which has a "3S3P" configuration (wherein the nomenclature "3S3P" refers to a battery pack with 3 serially-coupled (S) banks per pack and 3 parallel (P) cells per bank). As shown, battery pack 100 includes three serially-coupled banks 105-1, 105-2 and 105-3. Each bank 105-1, 105-2 and 105-3 further comprises three cells 110 (e.g., 110-1, 110-2 and 110-3), 115 (e.g., 115-1, 115-2 and 115-3) and 120 (e.g., 120-1, 120-2 and 120-3) coupled in parallel. As they are formed by the same types of cells of the same quantity, banks 105-1, 105-2 and 105-3 provide the same capacity and/or voltage, and thus offer battery pack 100 a symmetrical configuration. Note that cells 110, 115 and 120 may have different capacities and/or voltages from each other. For example, cell 110 may have a relatively medium capacity (M), cell 115 may provide a relatively small capacity (S), and cell 120 may possess the largest capacity (L). Additionally, conventional, symmetrical battery packs typically provide only two taps. For example, battery pack 100 includes a positive tap PACKP, which is coupled to the positive electrode of battery pack 100's top bank 105-1, and a negative tap PACKN, which is coupled to the negative electrode of bottom bank 105-3. The negative tap PACKN may be electrically coupled to earth or be a floating point, which provides a voltage reference. In this disclosure, the negative tap PACKN is regarded as the ground node. Note that, with only two taps, battery pack 100 provides only one single voltage (with respect to the voltage reference, the ground node PACKN).

A conventional, symmetrical battery pack, such as battery pack 100, has several limitations. First, electrical loads of the battery pack may require different supply voltage levels. For example, a central processing unit (CPU) may require a supply voltage of 1V, while a universal serially-coupled bus (USB) port may need a supply voltage of 5V, 12V, 20V, or some other voltages. However, a conventional, symmetrical battery pack typically provides only one voltage. To address the problem, one may use DC-DC converters to regulate the battery pack's single voltage to appropriate voltages for individual loads. However, the deployment of DC-DC converters will inevitably result in losses. For a battery-powered system, such as a portable electronic device, those losses are critical. They shorten the device's operating life and may even cause over-temperature issues. In addition, DC-DC converter's efficiency is in an inverse relation to the ratio between the converter's input and output voltages. The higher the ratio between the converter's input and output voltages, the lower the efficiency that the DC-DC converter will be able to achieve. Therefore, the number of serially-coupled banks of a symmetrical battery pack has to be chosen carefully in to optimize the battery-powered system's overall efficiency. However, with only one voltage level available, the optimization presents a challenging task.

Second, battery-powered systems normally have significant size and space limitations based on the design constraints of their particular product implementations. It is desirable to have a flexible battery packaging so that it can make a full use of available space. For example, banks and/or cells of small sizes and/or irregular shapes can fill up space near a corner, edge, or curve of a device's outer shell, while banks and/or cells of large and/or regular size may only be able to be installed in a normal, e.g., central, position within the device. However, such banks and/or cells of varying sizes and/or shapes cannot fit in a conventional symmetrical battery pack.

Finally, even if a battery pack is designed with balanced banks, building banks with identical capacities and/or voltage is challenging because of variations in material and manufacturing processes. Even if symmetrical banks are manufactured, imbalance can arise over the life of the battery pack, as bank capacities and impedances may degrade with time and cycles. An imbalanced battery pack has reduced capacity because the bank with the highest state of charge will cause the charging process to terminate, which means that banks of a lower state of charge never get fully charged. Conversely, when the battery pack is discharged, the bank with the least charge can cause the discharging process to stop, even though charge may remain the other bank. Additionally, imbalanced banks may even present a safety risk, for example, from over-charging because of capacity imbalances. Note that the state of charge of a bank, as used herein, refers to the ratio between its remaining amount of charge and its rated capacity. The state of charge is measured in percentage points, where a 100% state of charge represents a fully charged bank and a 0% state of charge indicates a fully discharged bank.

One solution to address those limitations of symmetrical battery packs is to adopt an asymmetrical battery pack configuration, wherein banks within the battery pack may have different capacities and/or voltages and the banks may be accessed by electrical loads through multiple taps. In the asymmetrical configurations, special control algorithms may be employed to ensure that the asymmetrical banks reach the top of charge and bottom of charge during charging and discharging at the same time. Therefore, what is needed is a multi-tapped, asymmetrical battery pack designed to balance the states of charge among its asymmetrical banks during charging and discharging processes.

SUMMARY

This disclosure describes a battery pack that includes asymmetrical banks, with different capacities and/or voltages, and multiple taps to power electrical loads. The battery pack may also comprise a balancing circuit that balances the states of charge among the asymmetrical banks, e.g., by moving charges among the banks, by controlling one or more (e.g., bidirectional) converters.

In some embodiments, the one or more converters may each comprise an inductor and a switching leg, which form a bidirectional buck-boost converter. Each of the bidirectional converters may regulate the voltages of associated banks and/or balance their states of charge, e.g., by moving charge among the banks of the battery pack.

In some embodiments, the one or more converters may share one single inductor, together with individual switching legs. The inductor and switching legs may form a single-input multiple-output (SIMO) bidirectional buck-boost converter. The SIMO converter may regulate the voltages of associated banks and balance their states of charge, e.g., by moving charge between the various asymmetrical banks.

In some embodiments, the balancing circuit may adopt a "hybrid" topology, which combines the above-described converter circuits. For example, the balancing circuit may regulate voltages and balance states of charge among a first set of banks through a plurality of buck-boost converters, each employing its own inductor. The balancing circuit may also regulate voltages and balance states of charge among a second set of banks through a SIMO converter, wherein the switching legs share one single inductor.

In some embodiments, the battery pack may include a protection circuit for each bank. The protection circuits may be coupled to the corresponding banks through the taps. The protection circuits may be selectably configured to conduct and/or block a flow of current through the tap to/from the corresponding bank during charging and discharging operations.

In some embodiments, the battery pack may comprise a battery management unit (BMU). The BMU may further include a battery monitoring system, a protection circuit control unit, a balancing circuit control unit, and a communication interface. The BMU may function as the "brain" of the battery pack to monitor battery pack's status, communicate with an external host system, process the monitored and/or communicated information, and/or generate control signals for the protection circuits and balancing circuit. The BMU may use a high-speed analog loop to regulate voltages and a low-speed digital loop to communicate with a host system to ensure that the banks reach the bottom of charge and/or top of charge at the same time.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an," "one," or "another" embodiment in this disclosure are not necessarily to the same or different embodiment, and they mean at least one. In order to be concise, a given figure may be used to illustrate the features of more than one embodiment, or more than one species of the disclosure, and not all elements in the figure may be required for a given embodiment or species.

FIGS. 4A and 4B illustrate the operational principles of a balancing circuit in buck mode, during discharging of an asymmetrical 2S battery pack, in accordance with one embodiment.

FIGS. 7A and 7B illustrate the operational principles of a balancing circuit in boost mode, during charging of an asymmetrical 2S battery pack, in accordance with one embodiment.

FIG. 9 is a schematic diagram illustrating an asymmetrical 3S battery pack, with a BMU, protection circuits, and a SIMO converter, in accordance with one embodiment.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
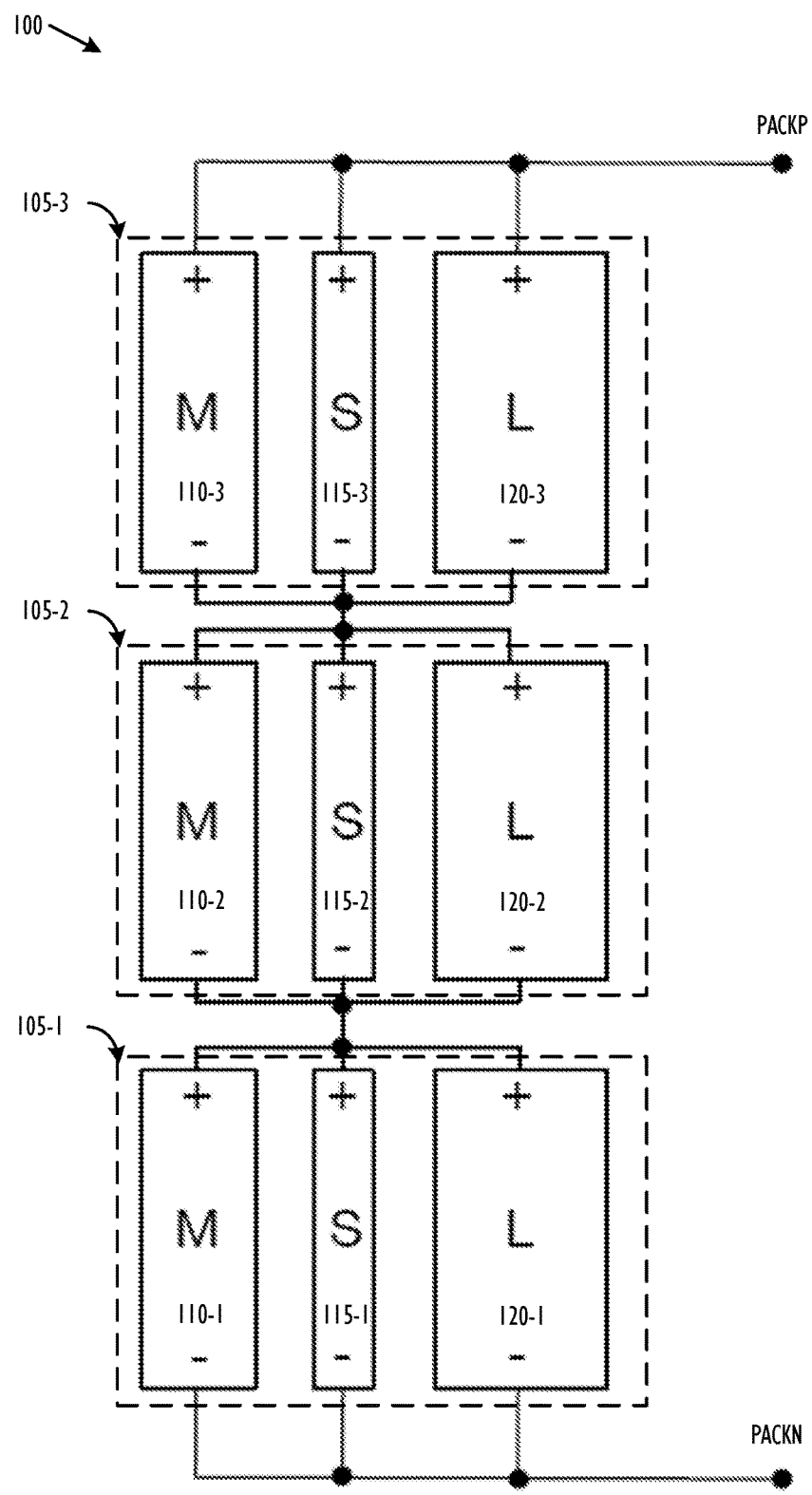
FIG. 1 is a schematic diagram illustrating a conventional symmetrical 3S3P battery pack.
Figure 2:
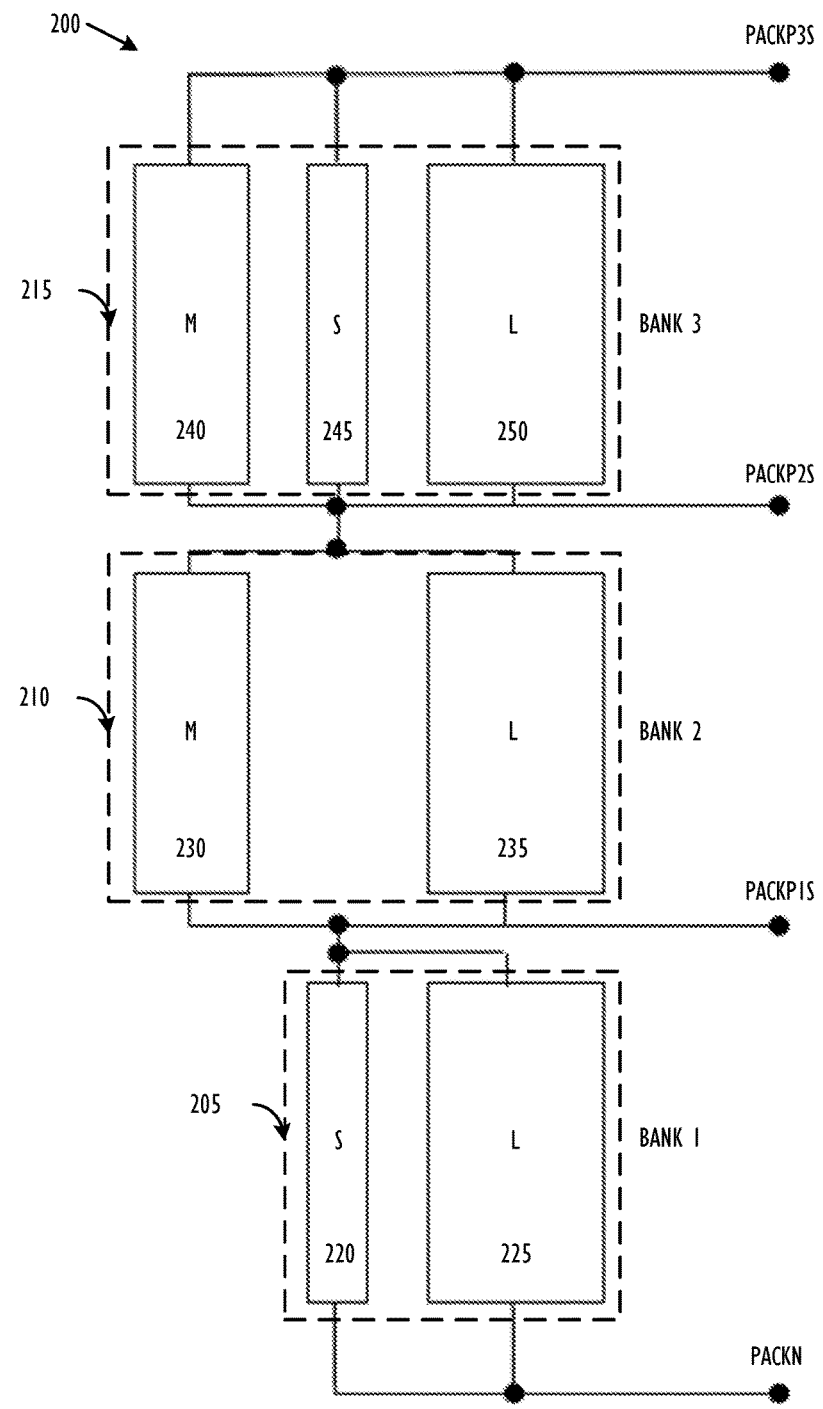
FIG. 2 is a schematic diagram illustrating an asymmetrical 3S battery pack in accordance with one embodiment.

FIG. 2 illustrates exemplary asymmetrical 3S (i.e., 3 serially-coupled (S) banks per pack) battery pack 200 in accordance with one embodiment. As shown, battery pack 200 includes three banks 205, 210 and 215 in series. Banks 205, 210 and 215 may have different capacities and/or voltages from each other. For example, bank 205 may include small cell 220 and large cell 225, which are connected in parallel. In comparison, bank 210 may comprise medium cell 230 and large cell 235 in parallel; and bank 215 may contain three cells 240, 245 and 250 in parallel. Further, battery pack 200 may provide multiple taps to allow an access to each individual bank 205, 210 and 215. Specifically, battery pack 200 may include a low-voltage tap PACKP1S coupled to bank 205, a medium-voltage tap PACKP2S coupled to bank 210, a high-voltage tap PACKP3S coupled to bank 215, and a negative tap PACKN that provides a ground node. With those multiple taps, battery pack 200 allows for the output of a greater number of different voltage levels, which may, e.g., be used to match the varying electrical loads encountered by the exemplary battery pack 200. For example, battery pack 200 may power a low-voltage load through PACKP1S, a medium-voltage load through PACKP2S, and a high-voltage load through PACKP3S. As described above, the multi-tap configuration can facilitate the voltage optimization and benefit the overall system efficiency. Note that because banks 205, 210 and 215 have different capacities and/or voltages, it is desirable to provide apparatuses and methods to balance the states of charge among the imbalanced banks so that they may possess equal or approximately equal states of charge, and/or reach the top of charge and bottom of charge at the same time during charging and discharging.

Figure 3:
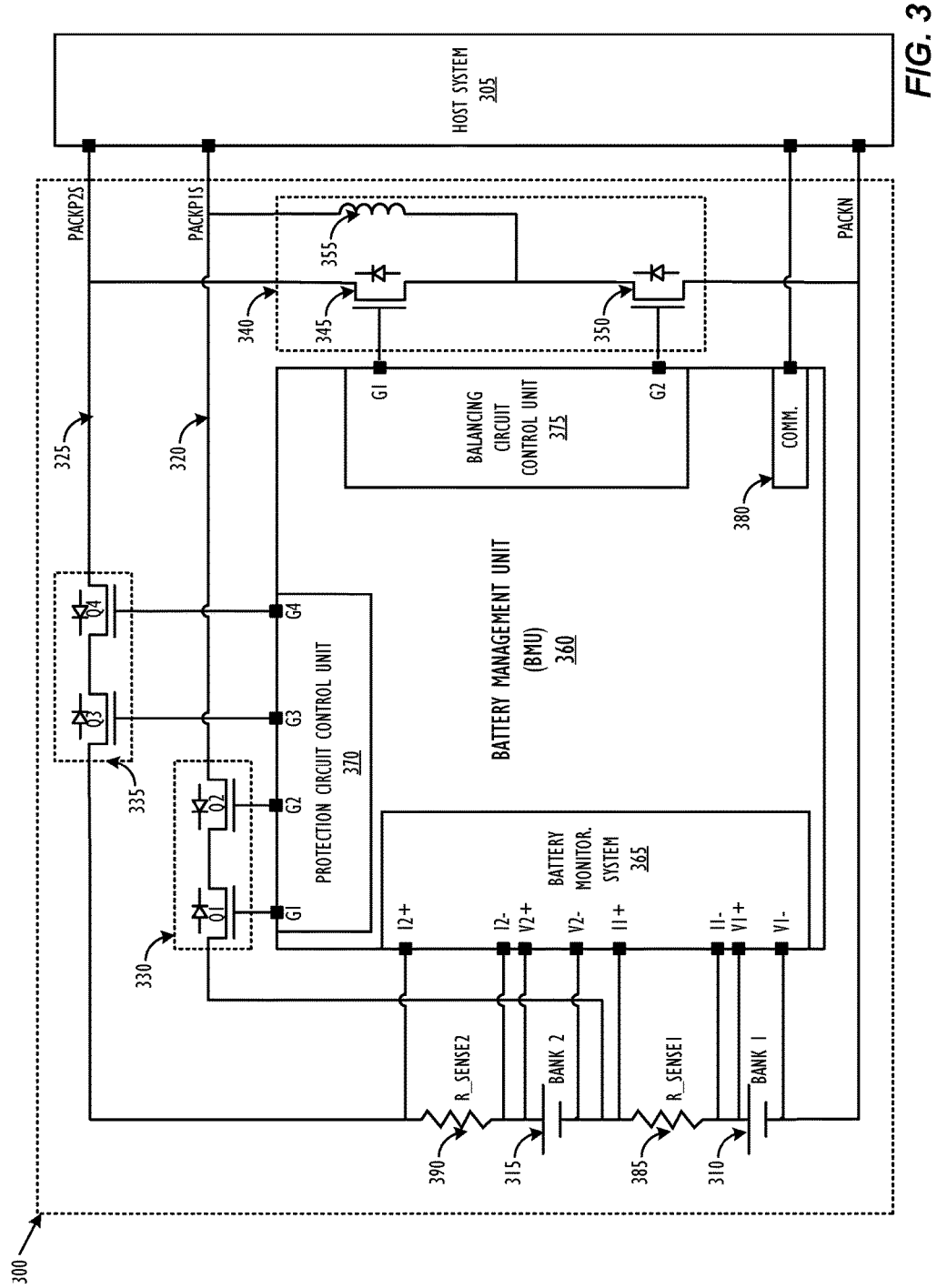
FIG. 3 is a schematic diagram illustrating an asymmetrical 2S battery pack, with a BMU, protection circuits, and a balancing circuit, in accordance with one embodiment.

FIG. 3 is a schematic diagram illustrating exemplary asymmetrical 2S (i.e., 2 serially-coupled (S) banks per pack) battery pack 300 in according with one embodiment. As shown, battery pack 300 may include two serially-coupled banks 310 and 315, which may have different capacities and/or voltages. Battery pack 300 may also provide three taps: low-voltage tap 320 (or PACKP1S), high-voltage tap 325 (or PACKP2S), and a negative tap (or PACKN). The negative tap PACKN provides a voltage reference as a ground node. With those multiple taps, banks 310 and 315 may be charged and/or discharge separately. For example, banks 310 and 315 may be charged, through taps 320 and 325 respectively, by host system 305 when it functions as a charger. Conversely, banks 310 and 315 may be discharged separately by host system 305 when it serves as an electrical load. Note that banks 310 and 315 may still be charged and discharged together as one group through tap 315. Regardless of the charging and/or discharging scenario, battery pack 300 may also be configured to balance the states of charge between the two banks.

The balancing capability may be provided by, for example, balancing circuit 340. As shown in FIG. 3, balancing circuit 340 may include a converter formed by field-effect transistors (FETs) 345-350 and inductor 355. FETs 345-350 may be coupled in series, forming a switching leg, between tap 325 and the ground node PACKN. Inductor 355 may have a first terminal and a second terminal. The first terminal of inductor 355 be coupled to a middle node (between FETs 345-350) of the switching leg, and the second terminal of inductor 355 may be coupled to tap 320. Balancing circuit 340 may function as a bidirectional buck-boost converter, regulating voltages of taps 320-325 and balancing the states of charge between banks 310-315. In particular, when in buck mode, balancing circuit 340 may step down the high voltage of tap 325 to a specified low voltage of tap 320, and move charge from bank 315 to bank 310, during charging and/or discharging of battery pack 300. Conversely, when in boost mode, balancing circuit 340 may step up the low voltage of tap 320 to a specified high voltage of tap 325, and move charge from bank 310 to bank 315, during charging and/or discharging of battery pack 300. Note that balancing circuit 340 is in a shunt connection with host system 305 such that balancing circuit 340 may not need to conduct the loading current of host system 305. Instead, balancing circuit 340 may focus on the balancing of states of charge between the banks. This may benefit the overall system efficiency. Also, note that FIG. 3 depicts the directionality of the body diode of FETs 345 and 350. Battery pack 300 may use discrete diodes, separate from the FETs, coupled in anti-parallel with FETs 345 and 350. Battery pack 300 may use metal-oxide-semiconductor FETs (MOSFETs), junction-gate FETs (JFETs), or other type of switching devices, e.g., insulated gate bipolar transistors (IGBTs), silicon carbine or gallium nitride devices.

In addition to the balancing circuit, battery pack 300 may also include a protection circuit for each of the two banks. As shown in FIG. 3, battery pack 300 may include protection circuit 330 for bank 310, and protection circuit 335 for bank 315. Protection circuits 330 and 335 may be coupled to their corresponding banks through taps 320 and 325, respectively. The primary purpose of the protection circuit is to isolate the banks from their electrical loads, when there is a fault. One way to provide the protection functionality is to use semiconductor devices. For example, in FIG. 3, protection circuits 330 and 335 each comprises two back-to-back FETs Q1-Q2 and Q3-Q4. Note that FIG. 3 also depicts the directionality of the body diode for each of the FETs Q1-Q2 and Q3-Q4. Protection circuits 330 and 335 may be configured to conduct or block a flow of current during charging and discharging of corresponding banks. For example, by closing FET Q1, protection circuit 330 may conduct a charging current to bank 310; by closing FET Q2, protection circuit 330 may conduct a discharging current from bank 310. By opening the corresponding FET, protection circuit 330 may block the charging and/or discharging current of bank 310.

Battery pack 300 may also comprise a central "brain" to control the protection circuits and balancing circuit appropriately. For example, battery pack 300 may use a battery management unit (BMU) 360 to implement the data acquisition, communication, signal processing and/or control functionalities. As shown in FIG. 3, BMU 360 may include battery monitoring system 365, protection circuit control unit 370, balancing circuit control unit 375, and/or communication interface 380. Battery monitoring system 365 may measure parameters such as currents, voltages and/or temperatures of battery pack 300, on the bank and/or cell levels. Note that, in the exemplary circuit diagram shown in FIG. 3, battery monitoring system 365 measures the current of each bank 310 and 315 through shunt resistors 385 and 390, respectively. The currents may be monitored through other types of current sensors, e.g., Hall-effect sensors. By monitoring the currents, voltage and/or temperatures, BMU 360 may be able to determine the status (e.g., states of charge, state of health, etc.) of banks 310 and 315, e.g., through current integration and/or a voltage vs. state-of-charge look-up table interpolation. BMU 360 may also transfer information, e.g., system status, states of charge, states of health, and/or fault alerts, with host system 305 via communication interface 380. Based on the monitored and/or transferred information, BMU 360 may generate appropriate control signals to drive balancing circuit 340 through balancing circuit control unit 375, and/or enable appropriate actions for protection circuits 330-335 through protection circuit control unit 370.

To facilitate an understanding of the disclosed concepts, FIGS. 4A and 4B provide simplified schematic diagrams to illustrate the operational principles of balancing circuit 340 from FIG. 3 when operating in the buck mode. For balancing circuit 340 to work as a buck converter, battery pack 300 may first close FET 345 and open FET 350, thus generating a charging current flowing through inductor 355 from tap 325 to tap 325. Next, battery pack 300 may open FET 345 and close FET 350, thus causing inductor 355 to be discharged through tap 320 and the ground node PACKN. Alternatively, battery pack 300 may disable FET 350, and use the body diode of FET 350 to "freewheel" the discharging current of inductor 355. When balancing circuit 340 is in the buck mode, it steps down its input voltage (e.g., the high voltage of tap 325) to its output voltage (e.g., a specified low voltage of tap 320). As it steps down the voltage, balancing circuit 340 steps up the current according to the conservation of energy principle. For example, as shown in FIG. 4A, the "average" input current $i_1$ of balancing circuit 340 is less than the "average" output current $i_2$ (i.e., $i_1 < i_2$). Assuming host system 305 is discharging the two banks by drawing currents $i_3$ and $i_4$ through taps 320 and 325, the actual discharging currents flowing through banks 310 and 315 are $(i_3+i_4+i_1-i_2)$ and $(i_3+i_1)$ respectively. In comparison, without balancing circuit 340 (and under the same discharging operation), banks 310 and 315 will be discharged with currents $(i_3+i_4)$ and $i_3$, respectively, as shown in FIG. 4B. Comparing the flow of currents with and without balancing circuit 340, it is noted that: (1) bank 310's discharging current decreases by $(i_2-i_1)$; and (2) bank 315's discharging current increases by $i_1$, by controlling balancing circuit 340. In other words, balancing circuit 340 moves charge from bank 315 to bank 310.

Figure 5A:
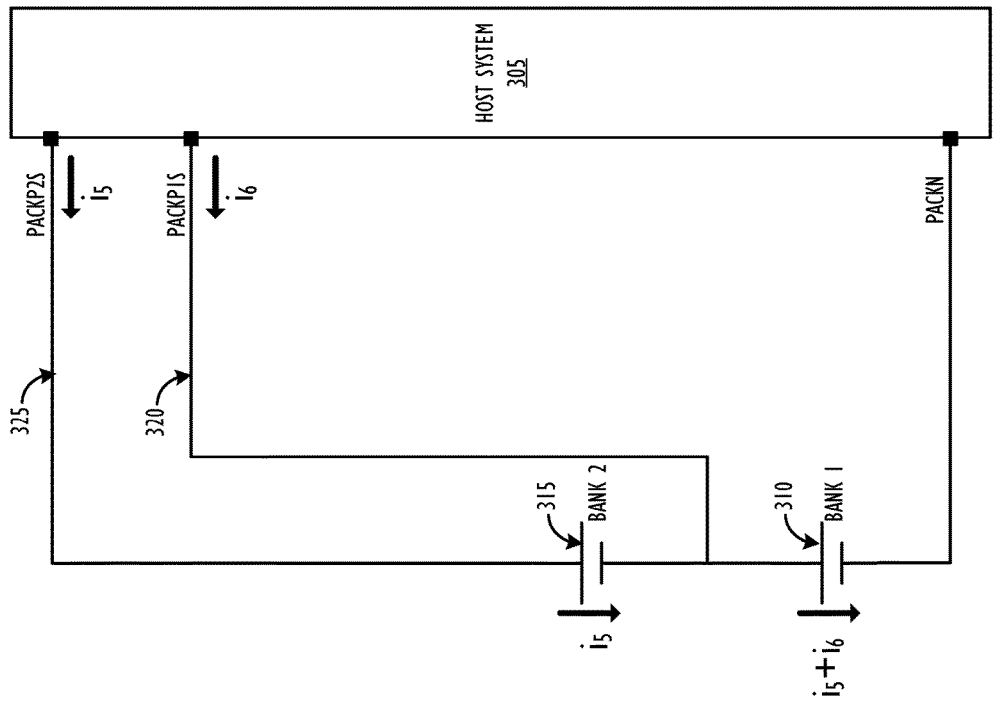
FIGS. 5A and 5B illustrate the operational principles of a balancing circuit in buck mode, during charging of an asymmetrical 2S battery pack, in accordance with one embodiment.
Figure 5B:
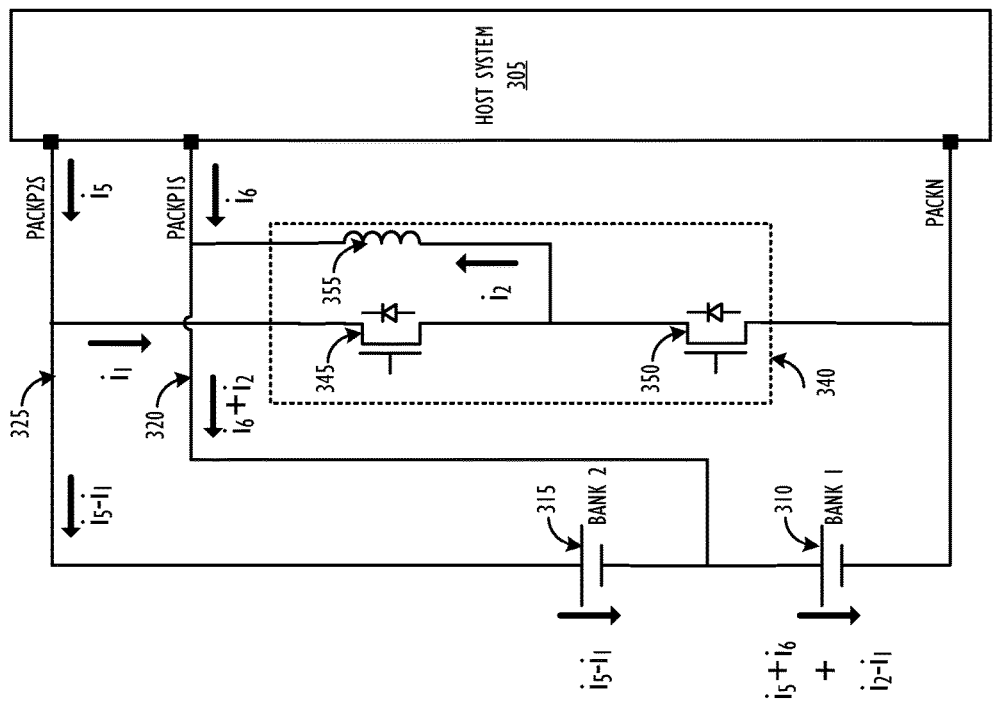

Balancing circuit 340 may also move charges from bank 315 to bank 310 during charging operations of the banks. As shown in FIG. 5A, host system 305 is charging banks 310 and 315 by injecting currents $i_6$ and $i_5$ through taps 320 and 325, respectively. As above identified, balancing circuit 340 steps down voltages and steps up currents in the buck mode (i.e., $i_1 < i_2$). Following Kirchoff's Current Law, the charging currents flowing through banks 310 and 315 are $(i_5+i_6+i_2-i_1)$ and $(i_5-i_1)$, respectively. FIG. 5B depicts the charging currents of banks 310 and 315 under the same charging operation, but without balancing circuit 340. The charging currents of banks 310 and 315 equal to $(i_5+i_6)$ and $i_5$, respectively. Comparing the flow of currents with and without balancing circuit 340, it is noted that: (1) bank 310's charging current increases by $(i_2-i_1)$; and (2) bank 315's charging current decreases by $i_1$, by controlling balancing circuit 340. In other words, balancing circuit 340 moves charge from bank 315 to bank 310. In summary, as a buck converter, balancing circuit 340 may step down a high voltage of tap 325 to a low voltage of tap 320, and move charge from bank 315 to bank 310, during the charging and/or discharging of the banks.

Figure 6A:
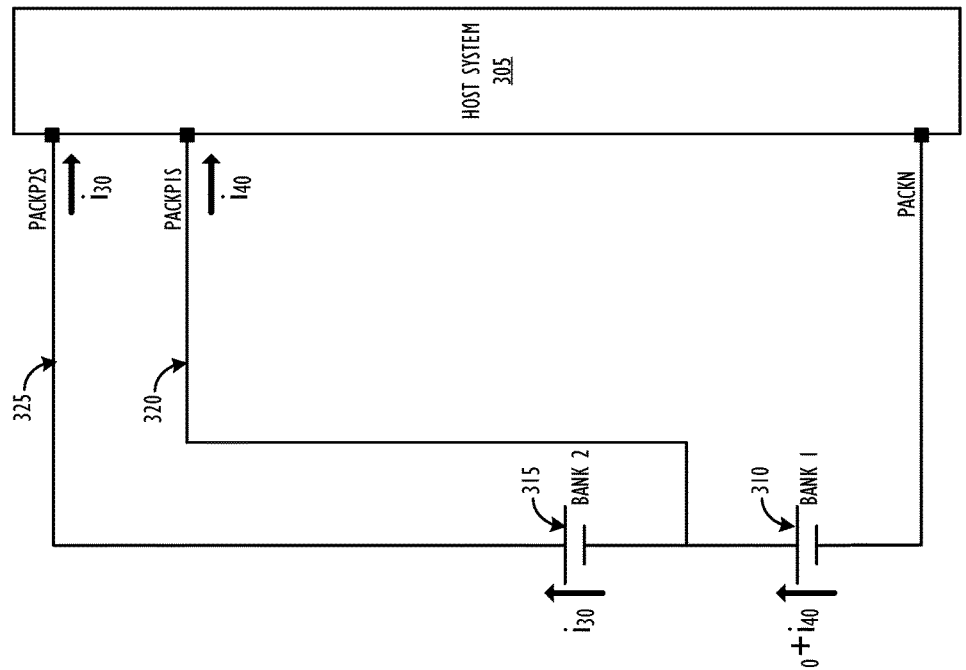
FIGS. 6A and 6B illustrate the operational principles of a balancing circuit in boost mode, during discharging of an asymmetrical 2S battery pack, in accordance with one embodiment.
Figure 6B:
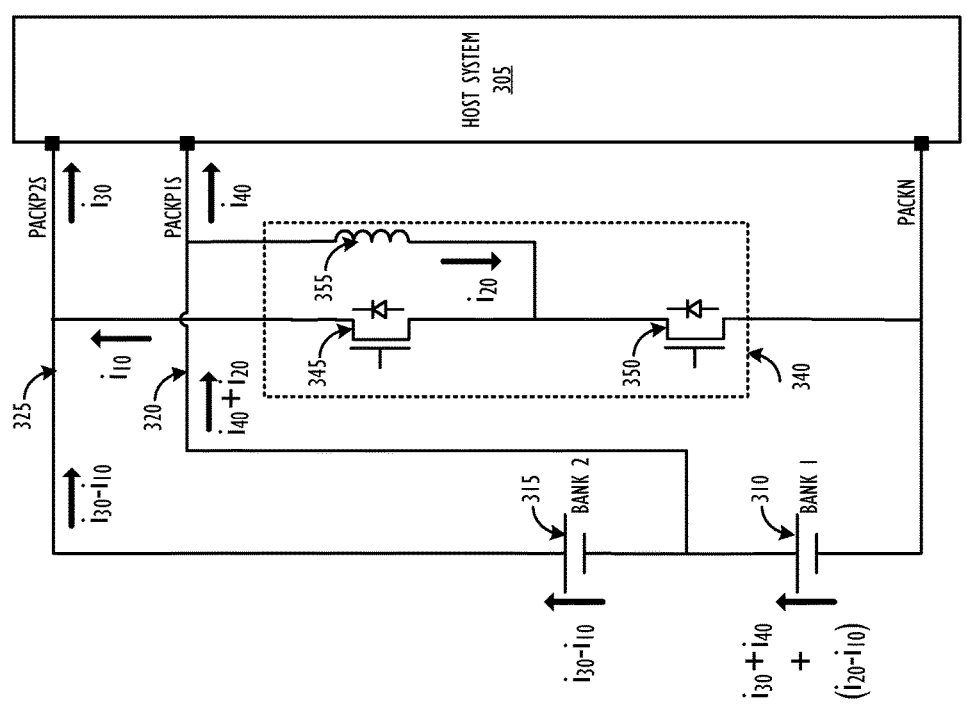

The same principles may be applied to the operations of balancing circuit 340 in the boost mode. FIGS. 6A and 6B provide simplified schematic diagrams to illustrate the operational principles of balancing circuit 340 in the boost mode. For balancing circuit 340 to work as a boost converter, battery pack 300 may first close FET 350 and open FET 345, thus generating a charging current flowing through inductor 355 from tap 320 to the ground node PACKN. Next, battery pack 300 may open FET 350 and close FET 345, thus adding a voltage generated by the energy accumulated in inductor 355 to the voltage of tap 320 and allowing both tap 320 and inductor 355 to charge tap 325. Alternatively, battery pack 300 may disable FET 345, and allow the body diode of FET 345 to "freewheel" the charging current to tap 325. When balancing circuit 340 is in the boost mode, it steps up its input voltage (e.g., the low voltage of tap 320) to its output voltage (e.g., a specified high voltage of tap 325). As it steps up the voltage, balancing circuit 340 steps down the current according to the conservation of energy principle. For example, as shown in FIG. 6A, the input current $i_{20}$ of balancing circuit 340 is larger than the output current $i_{10}$ (i.e., $i_{10} < i_{20}$). Assuming host system 305 is discharging the two banks by drawing currents $i_{30}$ and $i_{40}$ through taps 320 and 325, the actual discharging currents flowing through banks 310 and 315 are $(i_{30}+i_{40}+i_{20}-i_{10})$ and $(i_{30}-i_{10})$, respectively. In comparison, without balancing circuit 340 (and under the same discharging operation), banks 310 and 315 will be discharged with currents $(i_{30}+i_{40})$ and $i_{30}$, respectively, as shown in FIG. 6B. Comparing the flow of currents with and without balancing circuit 340, it is noted that: (1) bank 310's discharging current increase by $(i_{20}-i_{10})$; and (2) bank 315's discharging current decrease by $i_{10}$, by controlling balancing circuit 340. In other words, balancing circuit 340 moves charge from bank 310 to bank 315.

Similarly, balancing circuit 340 may also move charges from bank 310 to bank 315 during charging operations of the banks. As shown in FIG. 7A, host system 305 is charging banks 310 and 315 by injecting currents 160 and 150 through taps 320 and 325, respectively. As above identified, balancing circuit 340 steps up voltages and steps down currents in the boost mode (i.e., $i_{10} < i_{20}$). Following Kirchoff's Current Law, the charging currents flowing through banks 310 and 315 are $(i_{50}+i_{60}-(i_{20}-i_{10}))$ and $(i_{50}+i_{10})$, respectively. FIG. 7B depicts the charging currents of banks 310 and 315 under the same charging condition, but without balancing circuit 340. The charging currents of banks 310 and 315 equal to $(i_{50}+i_{60})$ and $i_{50}$, respectively. Comparing the flow of currents with and without balancing circuit 340, it is noted that: (1) bank 310's charging current decreases by $(i_{20}-i_{10})$, and (2) bank 315's charging current increases by $i_{10}$, by controlling balancing circuit 340. In other words, balancing circuit 340 moves charge from bank 310 to bank 315. In summary, as a boost converter, balancing circuit 340 may step up a low voltage of tap 320 to a high voltage of tap 325, and move charge from bank 310 to bank 315, during the charging and/or discharging of the banks. As may now be more fully understood based on FIGS. 4-7 and the corresponding descriptions above, balancing circuit 340, which may, e.g., be implemented as a bidirectional converter, may be used to balance the states of charge between banks 310 and 315 by moving charges between the two banks during their charging and/or discharging operations.

Battery pack 300 may employ various control approaches to operate balancing circuit 340 as a bidirectional converter. For example, battery pack 300 may use an analog loop to regulate the voltages of tap 320 and 325, and a digital loop to balance the states of charge between banks 310 and 315. The analog loop may be characterized as a high-speed control system based on, e.g., data acquisition and/or analog-device-based (e.g., microcontroller, microprocessor, field programmable gate array (FPGA), and/or complex programmable logic device (CPLD)) controllers, while the digital loop may run at a lower speed based on information transferred between BMU 360 and host system 305 via communication interface 380. Further, each of the two loops may include an outer loop and an inner loop. For example, for the high-speed voltage regulation, the outer loop may compare voltage feedbacks vs. voltage references and generate, e.g., current references through a control mechanism, e.g., a proportional-integral (PI) controller. Subsequently, the inner loop may compare current feedbacks vs. the current references, and generate duty cycles and gating signals accordingly. For the low-speed state of charge balancing, the outer loop may compare the states of charge of the two banks and generate, e.g., current references. The current references may be used to adjust (e.g., to be added to, subtracted from, and/or blended with) the current references generated by the high-speed loop, based on appropriate control algorithms, to "refine" the operating of balancing circuit 340, resulting in a balancing of the states of charge.

Figure 8:
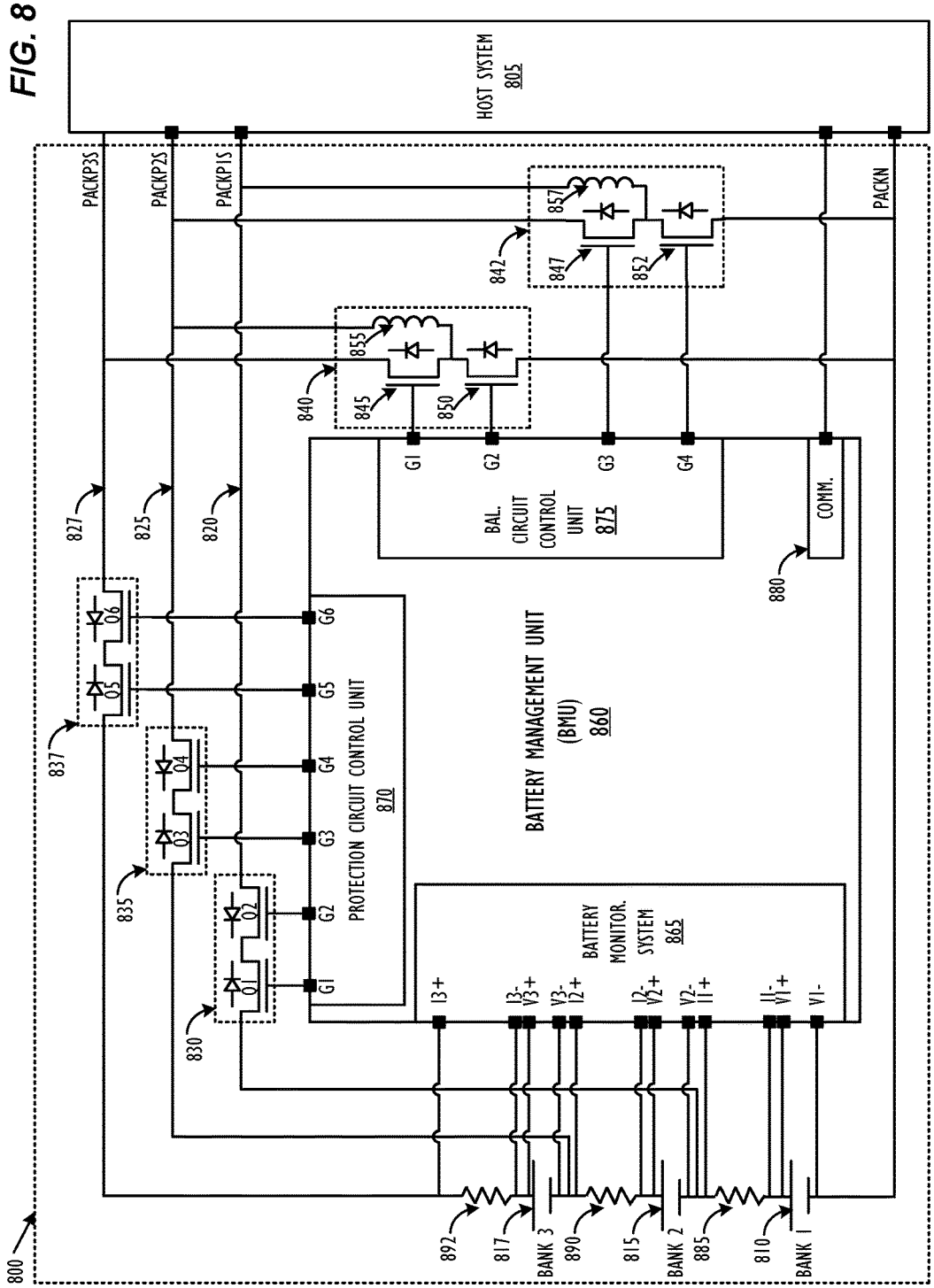
FIG. 8 is a schematic diagram illustrating an asymmetrical 3S battery pack, with a BMU, protection circuits, and two bidirectional buck-boost converters, in accordance with one embodiment.

The operating principles of battery pack 300 may also be applied to asymmetrical battery packs with more than two banks, e.g., an asymmetrical battery pack with N (N≥2) banks. FIG. 8 illustrates exemplary asymmetrical 3S (i.e., N=3) battery pack 800 that includes three serially-coupled banks 810, 815, and 817 in accordance with one embodiment. Banks 810, 815, and 817 may have different capacities and/or voltages from each other. Battery pack 800 may provide four taps: low-voltage tap 820 (or PACKP1S), medium-voltage tap 825 (or PACKP2S), high-voltage tap 827 (or PACKP3S), and a negative tap (or ground node PACKN). With those multiple taps, banks 810, 815, and 817 may be charged and/or discharge separately. For example, banks 810, 815 and 817 may be charged, through taps 820, 825 and 827 respectively, by host system 805 when it functions as a charger. Conversely, banks 810, 815 and 817 may be discharged separately by host system 305 when it serves as an electrical load. Note that banks 810, 815, and 817 may still be charged and discharged together as one group through tap 827.

Similar to battery pack 300, battery pack 800 may also include a protection circuit for each of the three banks and a battery management unit (BMU). As shown, banks 810, 815, and 817 each has a protection circuit, e.g., 830, 835, and 837, respectively. The protection circuits may employ a similar configuration as that of battery pack 300 described in FIG. 3. Thus, the protection circuit may be configured to conduct and/or block the flow of current for the corresponding bank in its charging and/or discharging operations. BMU 860 of battery pack 800 is similar to BMU 360 described in FIG. 3. For example, as shown in FIG. 8, BMU 860 includes battery monitoring system 865, protection circuit control unit 870, balancing circuit control unit 875, and/or communication interface 880. The functionalities of these subsystems of BMU 860 may be substantially similar to those of the corresponding subsystems of BMU 360. Further, as shown here, BMU 860 and its subsystems may include additional components and I/O ports in order to accommodate additional banks and expansion of the protection and balancing circuits. For example, battery pack 800 may include three shunt resistors 885, 890 and 892 for the current measurement of banks 810, 815 and 817 respectively. Accordingly, BMU 860's battery monitoring system 865 may include additional I/O ports to receive feedback signals from the corresponding shunt resistors. Similarly, BMU 860's protection circuit control unit 870 and balancing circuit control unit 875 may include additional I/O ports to drive additional switching devices of the corresponding circuits.

Battery pack 800 may balance the states of charge among its banks 810, 815, and 817 through a balancing circuit, for example, comprising two bidirectional converters, 840 and 842. As shown in FIG. 8, converter 840 may include a switching leg, formed by serially-coupled FETs 845 and 850, coupled between taps 827 and 825, and inductor 855. The first terminal of inductor 855 may be coupled to a node between FETs 845 and 850 and its second terminal may be coupled to tap 825. Converter 842 may employ the same topology as converter 840. In particular, converter 842 may include a switching leg, formed by serially-coupled FETs 847 and 852, coupled between taps 825 and 820, and inductor 857. The first terminal of inductor 857 may be coupled to a node between FETs 847 and 852 and its second terminal may be coupled to tap 820. As discussed with reference to FIGS. 3-7, each converter 840 and 842 may operate as a bidirectional converter, regulating voltages and balancing the states of charge between the corresponding banks, e.g., by moving charge between the corresponding banks during their charging and/or discharging. In particular, converter 840 may operate as a buck converter, stepping down a high voltage of tap 827 to a medium voltage of tap 825 and moving charge from bank 817 to bank 815. Conversely, converter 840 may also work as a boost converter, stepping up the medium voltage of tap 825 to the high voltage of tap 827 and moving charge from bank 815 to bank 817. Similarly, converter 842 may operate as a buck converter, stepping down the medium voltage of tap 825 to a low voltage of tap 820 and moving charge from bank 815 to bank 810. Conversely, converter 842 may also function as a boost converter, stepping up the low voltage of tap 820 to the medium voltage of tap 825 and moving charge from bank 810 to bank 815. Once the states of charge are balanced between banks 815 and 817, and between banks 810 and 815, the states of charge are balanced among all the three banks. Note that converters 840 and 842 are in shunt connections with host system 805 such that converters 840 and 842 may focus on the balancing of states of charge without conducting the loading currents of host system 805, which may benefit the overall system efficiency.

FIG. 9 depicts exemplary asymmetrical 3S (i.e., 3 serially-coupled (S) banks per pack) battery pack 900 that comprises a balancing circuit, in accordance with another embodiment. Note that battery pack 900 may include more than two banks, e.g., an asymmetrical battery pack with N banks, where N is equal to or greater than two. As shown, battery pack 900 has a substantially similar configuration as battery pack 800 in FIG. 8, except for balancing circuit 940. Instead of using multiple (e.g., two) inductors, balancing circuit 940 includes one single inductor 955, together with a switching leg formed by FETs 945 and 950. FETs 945 and 950 may be coupled in series between tap 827 and a ground node PACKN. Inductor 955 may have a first terminal and a second terminal. The first terminal of inductor 955 may be coupled to a node (between FETs 945 and 950) of the switching leg. The second terminal of inductor 955 may be coupled to taps 825 and 820. FETs 945 and 950, with inductor 955, may operate as a bidirectional buck-boost converter, as described in FIG. 3. Further, with FETs 947 and 952, battery pack 900 may direct the flow of power from/to taps 825 or 820 and then balance the states of charge of the corresponding banks accordingly. Therefore, balancing circuit 940 may function as a single-input double-output (SIDO) bidirectional buck-boost converter. For example, battery pack 900 may close FET 947 and open FET 952. Because the voltage of tap 825 is greater than the voltage of tap 820, the body diode of FET 952 is reverse-biased, and current will not flow to tap 820 through the body diode. Thus, battery pack 900 may regulate voltages between taps 827 and 825 and balance the states of charge between banks 817 and 815, following the principles explained above with reference to FIGS. 3-7. Conversely, battery pack 900 may open FET 947 and close FET 952. Because the body diode of FET 947 is reverse-biased, current will not flow to tap 825 through this body diode. Thus, battery pack 900 may regulate voltages between taps 827 and 820 and balance states of charge among banks 817 and 810. Once the states of charge are balanced between banks 815 and 817, and between banks 810 and 817, the states of charge are balanced among all the three banks. Note that balancing circuit 940 is in a shunt connection with host system 805 such that balancing circuit 940 may not need to conduct the loading currents of host system 805, which may benefit the overall system efficiency.

The concepts disclosed herein may be applied to an asymmetrical battery pack including more than one string of serially-coupled banks. For example, the asymmetrical battery pack may comprise two strings, wherein each string may include a plurality of serially-coupled banks. The serially-coupled banks may have different capacities and/or voltages from each other. Each bank may be coupled to a tap, which allows the charging and discharging of the corresponding bank individually. The asymmetrical battery pack may include a balancing circuit to regulate voltages of the taps and balance states of charge among the corresponding banks within the same or different strings. The balancing circuit may include one or more bidirectional converters, wherein each may comprise an inductor and a switching leg, e.g., as described above with reference to FIG. 8. The balancing circuit may also include one or more bidirectional converters that share one single inductor, together with individual switching legs. The inductor and switching legs may form a single input multiple-output (SIMO) bidirectional buck-boost converter, as described in FIG. 9. Further, the balancing circuit may employ a "hybrid" topology, which combines the above-described bidirectional converter circuits in FIGS. 8 and 9. For example, the balancing circuit may regulate voltages and/or balance states of charge among a first set of banks through a plurality of buck-boost converters, each employing its own inductor. The balancing circuit may also regulate voltages and/or balance states of charge among a second set of banks through a SIMO converter, wherein the switching legs share one single inductor.

The various embodiments described above are provided by way of illustration only and should not be constructed to limit the scope of the disclosure. Various modifications and changes can be made to the principles and embodiments herein without departing from the scope of the disclosure and without departing from the scope of claims.

The invention claimed is:

1. A battery system comprising:
a plurality of battery banks electrically coupled in series, at least two battery banks of the plurality of battery banks having different capacities from each other;
a plurality of taps, each tap coupled to one or more corresponding battery banks of the at least two battery banks; and
an electronic circuit coupled to the plurality of taps, the electronic circuit configured to balance states of charge among the at least two battery banks by moving charge among the at least two battery banks by controlling one or more converters;
wherein each of the at least two battery banks is coupled to a protection circuit through its corresponding tap, the protection circuit configured to selectably conduct and block charging and discharging current of the corresponding battery bank;
wherein the one or more converters comprise a first inductor and a first switching leg,
wherein the first switching leg comprises two or more serially-coupled switches, the first switching leg coupled between a first tap of the plurality of taps and a ground node,
wherein the first inductor comprises a first terminal and a second terminal, the first terminal of the first inductor coupled to a node between the two or more serially-coupled switches of the first switching leg, the second terminal of the first inductor coupled to a second tap of the plurality of taps, and
wherein the first inductor and the first switching leg are configured to selectably step down a first voltage of the first tap to a second voltage of the second tap, and step up the second voltage of the second tap to the first voltage of the first tap.

2. The battery system of claim 1,
wherein the one or more converters further comprises a second inductor and a second switching leg,
wherein the second switching leg comprises two or more serially-coupled switches, the second switching leg coupled between the second tap of the plurality of taps and a ground node,
wherein the second inductor comprises a first terminal and a second terminal, the first terminal of the second inductor coupled to the node between the two or more serially-coupled switches of the second switching leg, the second terminal of the second inductor coupled to a third tap of the plurality of taps, and
wherein the second inductor and the second switching leg are configured to selectably step down the second voltage of the second tap to a third voltage of the third tap, and step up the third voltage of the third tap to the second voltage of the second tap.

3. A battery system comprising:
a plurality of battery banks electrically coupled in series, at least two battery banks of the plurality of battery banks having different capacities from each other;
a plurality of taps, each tap coupled to one or more corresponding battery banks of the at least two battery banks; and
an electronic circuit coupled to the plurality of taps, the electronic circuit configured to balance states of charge among the at least two battery banks by moving charge among the at least two battery banks by controlling one or more converters;
wherein each of the at least two battery banks is coupled to a protection circuit through its corresponding tap, the protection circuit configured to selectably conduct and block charging and discharging current of the corresponding battery bank;
wherein the one or more converters comprises a first inductor, a first switching leg, a third switch and a fourth switch,
wherein the first switching leg comprises two or more serially-coupled switches, the first switching leg coupled between a first tap of the plurality of taps and a ground node,
wherein the first inductor comprises a first terminal and a second terminal, the first terminal of the first inductor coupled to a node between the two or more serially-coupled switches of the first switching leg, the second terminal of the first inductor coupled to a second tap of the plurality of taps via the third switch,
the second terminal of the first inductor coupled to a third tap of the plurality of taps via the fourth switch,
wherein the first inductor, the first switching leg and the third switch are configured to selectably step down the first voltage of the first tap to the second voltage of the second tap, and step up the second voltage of the second tap to the first voltage of the first tap, and
wherein the first inductor, the first switching leg and the fourth switch are configured to selectably step down the first voltage of the first tap to a third voltage of a third tap, and step up the third voltage of the third tap to the first voltage of the first tap.

4. The battery system of claim 1, wherein at least one of the plurality of battery banks comprises one or more battery cells.

5. The battery system of claim 4, wherein when the at least one of the plurality of battery banks comprises two or more battery cells, the two or more battery cells are coupled in parallel.

6. The battery system of claim 1, further comprising a battery management unit configured to:

monitor information representative of at least one of a voltage, a current, a temperature, and a state of charge for at least one of the at least two battery banks; and generate a first set of control signals to drive the one or more converters based on the monitored information.

7. The battery system of claim 6, wherein the battery management unit is configured to:
generate the first set of control signals to drive the one or more converters to regulate voltages of the at least two battery banks by using a high-speed control loop, and
adjust the first set of control signals to balance states of charge among the at least two battery banks by using a low speed control loop.

8. A method for balancing states of charge for a battery system, the battery system comprising a plurality of battery banks and a plurality of taps, at least two battery banks of the plurality of battery banks having different capacities from each other, the method comprising:
balancing the states of charge among the at least two battery banks by moving charges among the at least two battery banks by controlling one or more converters, wherein each of the plurality of taps is coupled to one or more corresponding battery banks of the at least two battery banks; and
providing a protection circuit for each of the at least two battery banks through its corresponding tap, the protection circuit configured to selectably conduct and block charging and discharging current of the corresponding battery bank;
wherein the one or more converters comprise a first inductor and a first switching leg,
wherein the first switching leg comprises two or more serially-coupled switches, the first switching leg coupled between a first tap of the plurality of taps and a ground node,
wherein the first inductor comprises a first terminal and a second terminal, the first terminal of the first inductor coupled to a node between the two or more serially-coupled switches of the first switching leg, the second terminal of the first inductor coupled to a second tap of the plurality of taps, and
wherein the first inductor and the first switching leg are configured to selectably step down a first voltage of the first tap to a second voltage of the second tap, and step up the second voltage of the second tap to the first voltage of the first tap.

9. The method of claim 8,
wherein the one or more converters further comprises a second inductor and a second switching leg,
wherein the second switching leg comprises two or more serially-coupled switches, the second switching leg coupled between the second tap of the plurality of taps and a ground node,
wherein the second inductor comprises a first terminal and a second terminal, the first terminal of the second inductor coupled to the node between the two or more serially-coupled switches of the second switching leg, the second terminal of the second inductor coupled to a third tap of the plurality of taps, and
wherein the second inductor and the second switching leg are configured to selectably step down the second voltage of the second tap to a third voltage of the third tap, and step up the third voltage of the third tap to the second voltage of the second tap.

10. A method for balancing states of charge for a battery system, the battery system comprising a plurality of battery banks and a plurality of taps, at least two battery banks of the plurality of battery banks having different capacities from each other, the method comprising:
balancing the states of charge among the at least two battery banks by moving charges among the at least two battery banks by controlling one or more converters, wherein each of the plurality of taps is coupled to one or more corresponding battery banks of the at least two battery banks; and
providing a protection circuit for each of the at least two battery banks through its corresponding tap, the protection circuit configured to selectably conduct and block charging and discharging current of the corresponding battery bank;
wherein the one or more converters comprises a first inductor, a first switching leg, a third switch and a fourth switch,
wherein the first switching leg comprises two or more serially-coupled switches, the first switching leg coupled between a first tap of the plurality of taps and a ground node,
wherein the first inductor comprises a first terminal and a second terminal, the first terminal of the first inductor coupled to a node between the two or more serially-coupled switches of the first switching leg, the second terminal of the first inductor coupled to a second tap of the plurality of taps through the third switch, the second terminal of the first inductor coupled to a third tap of the plurality of taps through the fourth switch,
wherein the first inductor, the first switching leg and the third switch are configured to selectably step down the first voltage of the first tap to the second voltage of the second tap, and step up the second voltage of the second tap to the first voltage of the first tap, and
wherein the first inductor, the first switching leg and the fourth switch are configured to selectably step down the first voltage of the first tap to a third voltage of the third tap, and step up the third voltage of the third tap to the first voltage of the first tap.

11. The method of claim 8, wherein at least one of the plurality of battery banks comprises one or more battery cells.

12. The method of claim 11, wherein when the at least one of the plurality of battery banks comprises two or more battery cells, the two or more battery cells are coupled in parallel.

13. The method of claim 8, further comprising using a battery management unit to:
monitor information representative of at least one of a voltage, a current, a temperature, and a state of charge for at least one battery cell bank of the at least two battery banks; and
generate a first set of control signals to drive the one or more converters based on the monitored information.

14. The method of claim 13, wherein the battery management unit is configured to:
generate the first set of control signals to drive the one or more converters to regulate voltages of the at least two battery banks by using a high-speed control loop, and
adjust the first set of control signals to balance states of charge among the at least two battery banks by using a low-speed control loop.

15. A method of operating a battery system, the battery system comprising a plurality of battery banks and a plurality of taps, at least two battery banks of the plurality of battery banks having different capacities from each other, the method comprising:

adjusting the states of charge among the at least two battery banks by transferring charges among the at least two battery banks by controlling one or more converters, wherein each of the plurality of taps is coupled to one or more corresponding battery banks of the at least two battery banks; and providing a protection circuit for each of the at least two battery banks through its corresponding tap, the protection circuit configured to selectably conduct and block charging and discharging current of the corresponding battery bank;

wherein the one or more converters comprise a first inductor and a first switching leg, wherein the first switching leg comprises two or more serially-coupled switches, the first switching leg coupled between a first tap of the plurality of taps and a ground node, wherein the first inductor comprises a first terminal and a second terminal, the first terminal of the first inductor coupled to a node between the two or more serially-coupled switches of the first switching leg, the second terminal of the first inductor coupled to a second tap of the plurality of taps, and wherein the first inductor and the first switching leg are configured to selectably step down a first voltage of the first tap to a second voltage of the second tap, and step up the second voltage of the second tap to the first voltage of the first tap.

16. The method of claim 15,
wherein at least one of the plurality of battery banks comprises one or more battery cells, and
wherein when the at least one of the plurality of battery banks comprises two or more battery cells, the two or more battery cells are coupled in parallel.

17. The method of claim 15,
wherein the one or more converters further comprises a second inductor and a second switching leg,
wherein the second switching leg comprises two or more serially-coupled switches, the second switching leg coupled between the second tap of the plurality of taps and a ground node,
wherein the second inductor comprises a first terminal and a second terminal, the first terminal of the second inductor coupled to the node between the two or more serially-coupled switches of the second switching leg, the second terminal of the second inductor coupled to a third tap of the plurality of taps, and
wherein the second inductor and the second switching leg are configured to selectably step down the second voltage of the second tap to a third voltage of the third tap, and step up the third voltage of the third tap to the second voltage of the second tap.

18. A method of operating a battery system, the battery system comprising a plurality of battery banks and a plurality of taps, at least two battery banks of the plurality of battery banks having different capacities from each other, the method comprising:
adjusting the states of charge among the at least two battery banks by transferring charges among the at least two battery banks by controlling one or more converters, wherein each of the plurality of taps is coupled to one or more corresponding battery banks of the at least two battery banks; and providing a protection circuit for each of the at least two battery banks through its corresponding tap, the protection circuit configured to selectably conduct and block charging and discharging current of the corresponding battery bank;

wherein the one or more converters comprises a first inductor, a first switching leg, a third switch and a fourth switch, wherein the first switching leg comprises two or more serially-coupled switches, the first switching leg coupled between a first tap of the plurality of taps and a ground node, wherein the first inductor comprises a first terminal and a second terminal, the first terminal of the first inductor coupled to a node between the two or more serially-coupled switches of the first switching leg, the second terminal of the first inductor coupled to a second tap of the plurality of taps through the third switch, the second terminal of the first inductor coupled to a third tap of the plurality of taps through the fourth switch, wherein the first inductor, the first switching leg and the third switch are configured to selectably step down the first voltage of the first tap to the second voltage of the second tap, and step up the second voltage of the second tap to the first voltage of the first tap, and wherein the first inductor, the first switching leg and the fourth switch are configured to selectably step down the first voltage of the first tap to a third voltage of the third tap, and step up the third voltage of the third tap to the first voltage of the first tap.

19. The method of claim 18,
wherein at least one of the plurality of battery banks comprises one or more battery cells, and
wherein when the at least one of the plurality of battery banks comprises two or more battery cells, the two or more battery cells are coupled in parallel.

20. The battery system of claim 3, wherein at least one of the plurality of battery banks comprises one or more battery cells.

21. The battery system of claim 20, wherein when the at least one of the plurality of battery banks comprises two or more battery cells, the two or more battery cells are coupled in parallel.

22. The battery system of claim 3, further comprising a battery management unit configured to:
monitor information representative of at least one of a voltage, a current, a temperature, and a state of charge for at least one of the at least two battery banks; and
generate a first set of control signals to drive the one or more converters based on the monitored information.

23. The battery system of claim 22, wherein the battery management unit is configured to:
generate the first set of control signals to drive the one or more converters to regulate voltages of the at least two battery banks by using a high-speed control loop, and
adjust the first set of control signals to balance states of charge among the at least two battery banks by using a low speed control loop.

24. The method of claim 10, wherein at least one of the plurality of battery banks comprises one or more battery cells.

25. The method of claim 24, wherein when the at least one of the plurality of battery banks comprises two or more battery cells, the two or more battery cells are coupled in parallel.

26. The method of claim 10, further comprising using a battery management unit to:

monitor information representative of at least one of a voltage, a current, a temperature, and a state of charge for at least one battery cell bank of the at least two battery banks; and generate a first set of control signals to drive the one or more converters based on the monitored information.

27. The method of claim 26, wherein the battery management unit is configured to:

generate the first set of control signals to drive the one or more converters to regulate voltages of the at least two battery banks by using a high-speed control loop, and adjust the first set of control signals to balance states of charge among the at least two battery banks by using a low-speed control loop.

* * * * *